US012623725B2

(12) United States Patent
Hata et al.

(10) Patent No.: US 12,623,725 B2
(45) Date of Patent: May 12, 2026

(54) VEHICLE REAR STRUCTURE

(71) Applicant: TOYOTA JIDOSHA KABUSHIKI KAISHA, Aichi-ken (JP)

(72) Inventors: Masatoshi Hata, Toyota (JP); Taisuke Satoi, Okazaki (JP); Masaya Egami, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 341 days.

(21) Appl. No.: 18/544,439

(22) Filed: Dec. 19, 2023

(65) Prior Publication Data

US 2024/0208579 A1      Jun. 27, 2024

(30) Foreign Application Priority Data

Dec. 26, 2022      (JP) ................................. 2022-207921

(51) Int. Cl.
| | |
|---|---|
| *B62D 25/02* | (2006.01) |
| *B62D 25/08* | (2006.01) |
| *B62D 25/20* | (2006.01) |
| *B62D 29/00* | (2006.01) |

(52) U.S. Cl.
CPC ........... *B62D 25/02* (2013.01); *B62D 25/088* (2013.01); *B62D 25/2027* (2013.01); *B62D 25/087* (2013.01); *B62D 29/008* (2013.01)

(58) Field of Classification Search
CPC .. B62D 25/02; B62D 25/088; B62D 25/2027; B62D 25/087; B62D 29/008
See application file for complete search history.

(56) References Cited

U.S. PATENT DOCUMENTS

| | | |
|---|---|---|
| 2016/0347373 A1 | 12/2016 | An et al. |
| 2021/0016840 A1 | 1/2021 | Moss et al. |

FOREIGN PATENT DOCUMENTS

| | | | |
|---|---|---|---|
| DE | 10227635 A1 * | 1/2004 | ........... B62D 25/087 |
| JP | H06-286652 A | 10/1994 | |
| JP | 2016-222223 A | 12/2016 | |

* cited by examiner

*Primary Examiner* — Dany E Akakpo
(74) *Attorney, Agent, or Firm* — HAUPTMAN HAM, LLP

(57) ABSTRACT

The vehicle rear structure comprises a pair of rear component members, a pair of rear side members, a cross connection member, and a pair of vertical posts. The cross connection member includes a connecting portion and an arm portion. The connecting portion is disposed rearward of the rear component member and extends in the vehicle width direction. The arm portion extends from both ends of the connecting portion in the vehicle width direction toward the front of the vehicle and is connected to the tower portion. The cross connection member has a substantially U-shape convex toward the rear of the vehicle in a plan view. The vertical post vertically connects the arm portion and the rear side member.

5 Claims, 3 Drawing Sheets

VEHICLE REAR STRUCTURE

CROSS REFERENCE TO RELATED APPLICATION

This application claims priority to Japanese Patent Application No. 2022-207921 filed on Dec. 26, 2022, which is incorporated herein by reference in its entirety including the specification, claims, drawings, and abstract.

TECHNICAL FIELD

This specification discloses a vehicle rear structure.

BACKGROUND

Generally, a suspension, a suspension member, a suspension tower, and a rear side member are disposed at a rear portion of a vehicle. Patent Document 1 discloses a technique of integrally molding a suspension member and a suspension tower by casting for the purpose of improving collision safety. According to this technique, collision safety can be improved to some extent.

However, in Patent Document 1, the structure behind the casting member was not sufficiently examined. Accordingly, the present specification discloses a vehicle rear structure capable of further improving the rigidity of the vehicle rear portion.

CITATION LIST

PATENT DOCUMENT 1: JP.H06286652.A

SUMMARY

A vehicle rear structure disclosed in the present specification comprises a pair of rear component members disposed at intervals in a vehicle width direction; a pair of rear side members disposed at intervals in the vehicle width direction, each of which extending from a rear end of the rear component member toward a rear side of the vehicle; a cross connection member connecting the pair of rear component members to each other; and a pair of vertical posts, wherein the rear component member is a hollow member in which a main body portion, a tower portion, and a suspension member portion are integrally cast, the main body portion has a front end connected to a rear pillar and a rear end connected to the rear side member, the tower portion has a tower shape opened toward a lower side of the vehicle so as to receive a part of a suspension device, and extends from the main body portion toward an upper side of the vehicle, the suspension member portion supports the suspension device, has a front end connected to a rocker, and extends from the main body portion toward the lower side of the vehicle, the cross connection member includes a connecting portion and a pair of arm portions, the connecting portion is disposed rearward of the rear component member and extends in the vehicle width direction, the arm portion extends from both ends of the connecting portion in the vehicle width direction toward the front side of the vehicle, and is connected to the tower portion, the cross connection member has an approximately U-shaped shape convex toward a rear side in a plan view, and the vertical post vertically connects the arm portion and the rear side member.

With such a configuration, it is possible to improve the rigidity of the vehicle behind the rear component member.

In this case, the rear side member may extend from the rear end of the main body portion toward a rear side of the vehicle, and in a side view of the vehicle, a rectangular ring shape may be formed by the rear side member, the vertical post, the arm portion, and the tower portion.

By forming the rectangular ring shape, the rigidity of the rear portion of the vehicle can be further improved.

A rear end of the rear side member may be positioned rearward of a rear end of the cross connection member.

With this configuration, when a rear collision occurs, the collision load can be received by the rear side member having high rigidity. As a result, deformation of the rear portion of the vehicle can be suppressed.

The arm portion may be inclined with respect to the rear side member in a plan view such that a front end of the arm portion is positioned at an outer side in the vehicle width direction than the rear side member and a rear end of the arm portion is positioned at an inner side in the vehicle width direction than the rear side member, and the vertical post may be disposed at a position where the arm portion and the rear side member intersect with each other in a plan view.

With such a configuration, the shape of the vertical post can be simplified.

The vehicle rear structure further may comprise an access opening in communication with a luggage space; and a rear door for opening and closing the access opening, wherein the access opening extends in an approximately horizontal direction at a height substantially equal to that of the cross connection member, the cross connection member surrounds a portion of a peripheral edge of the access opening, the rear door is disposed above the cross connection member, and the rear side member and the cross connection member are cylindrical extruded members.

With this configuration, the rigidity of the vehicle around the access opening can be improved. Further, the downward force generated when the rear door is closed can be supported by the vertical post.

According to the vehicle rear structure disclosed in this specification, the rigidity of the vehicle rear portion can be further improved.

BRIEF DESCRIPTION OF DRAWINGS

Embodiment(s) of the present disclosure will be described based on the following figures, wherein.

DESCRIPTION OF EMBODIMENT

Figure 1:
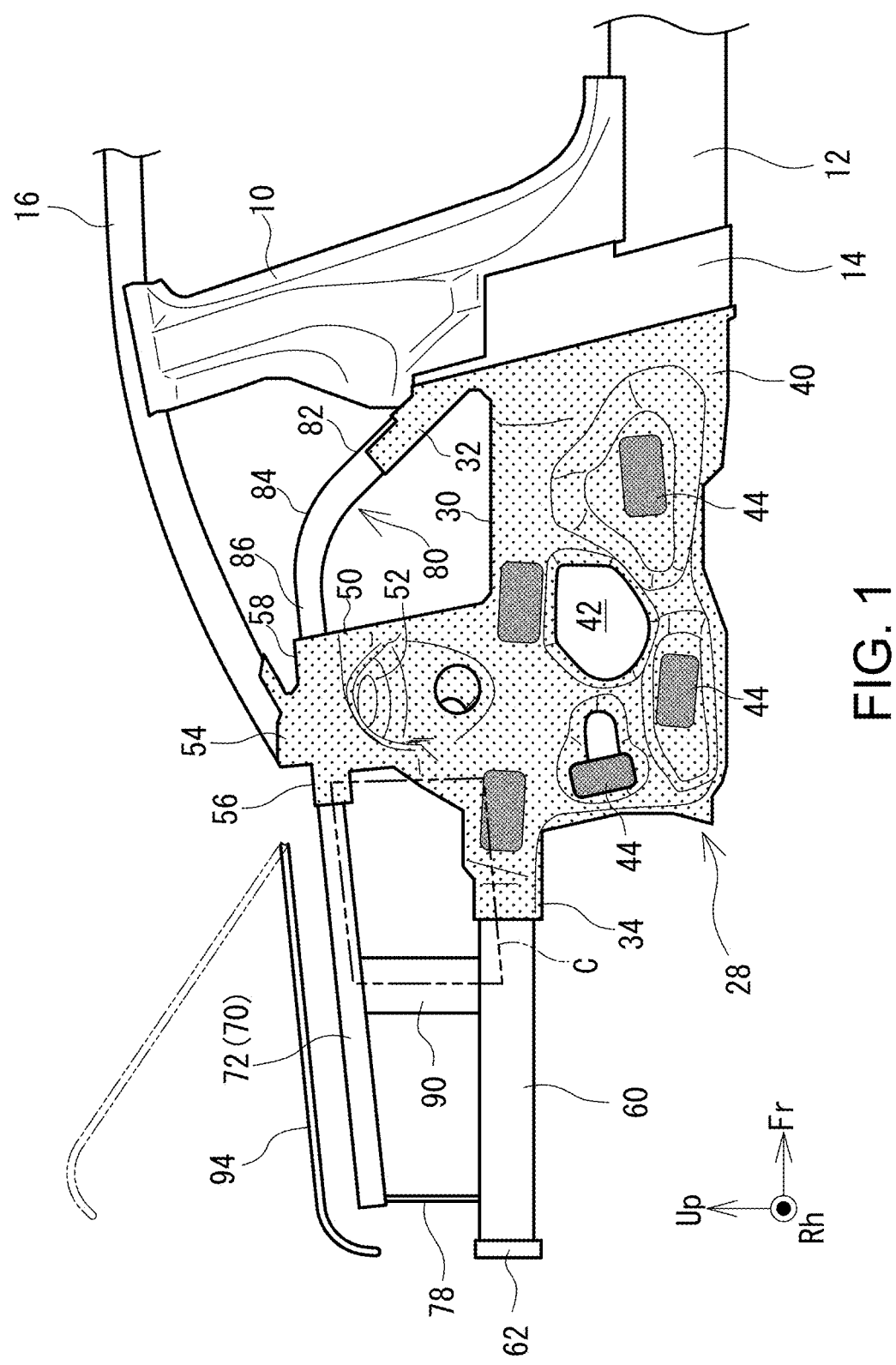
FIG. 1 is a right side view of a vehicle rear structure.
Figure 2:
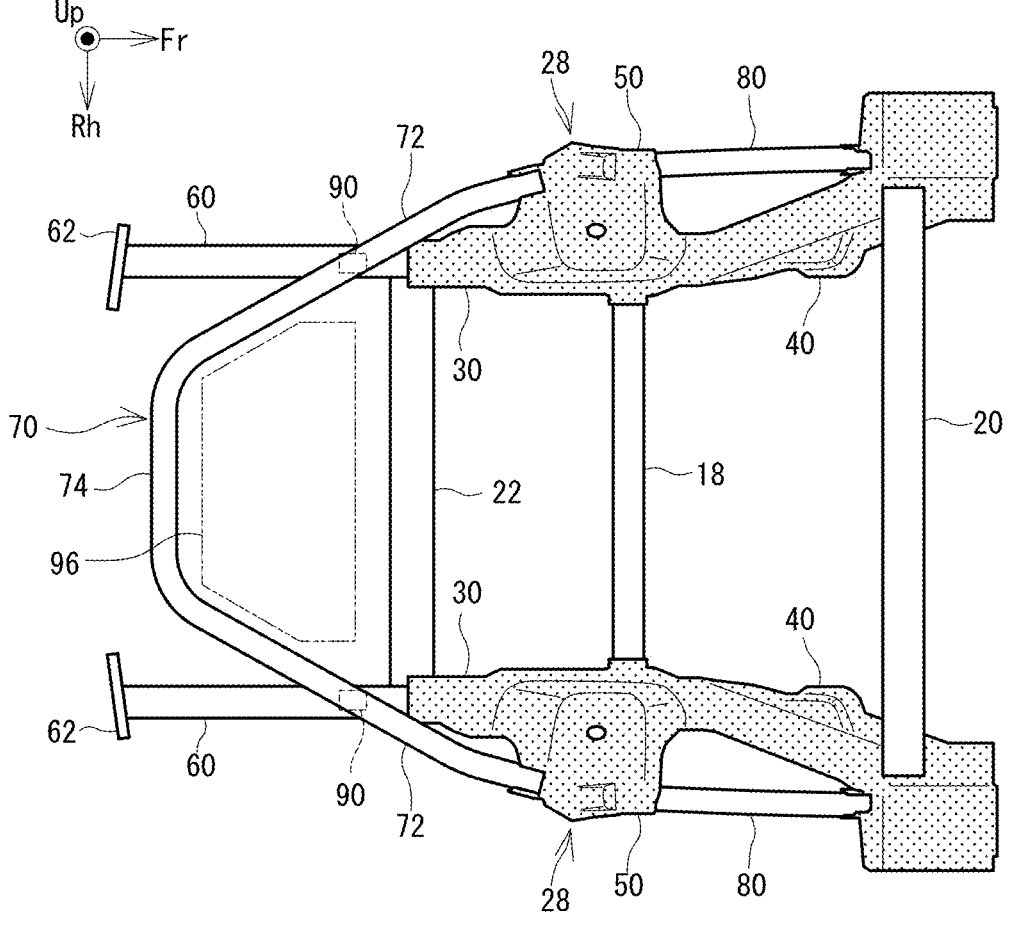
FIG. 2 is a plan view of a vehicle rear structure.

Hereinafter, a vehicle rear structure will be described with reference to the drawings. FIG. 1 is a right side view of a vehicle rear structure; FIG. 2 is a plan view of the vehicle rear structure. In the drawings, "Fr", "Up" and "Rh" indicate front, upper, and right sides of the vehicle, respectively. In FIG. 2, the rear pillar 10, the rocker 12, the roof rail 16 and the rear door 94 are not shown.

The vehicle rear structure is generally bilaterally symmetrical, as shown in FIG. 2. Therefore, many of the elements included in the vehicle rear structure are arranged at intervals in the vehicle width direction two by two. For example, the rear pillar 10 (not shown in FIG. 2), the rocker 12 (not shown in FIG. 2), the roof rail 16 (not shown in FIG. 2), the rear component member 28, the rear side member 60, and the connecting member 80 are all arranged two by two.

As shown in FIG. 1, the rear pillar 10 is a skeleton member extending in the vertical direction of the vehicle. The lower end of the rear pillar 10 is connected to the vicinity of the rear end of the rocker 12. The upper end of the rear pillar 10 is connected to the roof rail 16.

The rocker 12 is a skeleton member extending in the front-rear direction of the vehicle at a lower portion of the vehicle. The roof rail 16 is a skeleton member disposed at a boundary between a side surface and a top surface of the vehicle. The rear pillar 10 is connected to an intermediate portion of the roof rail 16.

A rear component member 28 is disposed rearward of the rear pillar 10. In FIGS. 1 and 2, the rear component members 28 are gray-hatched. The rear component member 28 is a casting member made of metal such as aluminum. The rear component member 28 is a hollow member having a thickness in the vehicle width direction and having a space formed therein. The front end of the rear component member 28 is connected to the rear pillar 10 and the rocker 12. In order to reinforce the connection, the connection plate 14 is bonded to the rear component member 28, the rear pillar 10, and the rocker 12.

As shown in FIG. 1, the rear component member 28 is roughly divided into a main body portion 30, a suspension member portion 40, and a tower portion 50. The main body portion 30 has a front end connected to the rear pillar 10 and a rear end connected to the rear side member 60. In other words, the main body portion 30 is a portion elongated in the front-rear direction of the vehicle. The main body portion 30 functions as a side member. A first assembly portion 32 is formed at an upper front corner of the main body portion 30. The first assembly portion 32 is a portion to which a front end of a connecting member 80 described later is assembled. The first assembly portion 32 stands from the upper front corner of the main body portion 30 in an obliquely upward direction toward the rear of the vehicle. A second assembly portion 34 is formed at the rear end of the main body portion 30. The second assembly portion 34 is a portion to which a front end of a rear side member 60 described later is assembled. The second assembly portion 34 has a rectangular tube shape into which the rear side member 60 having a rectangular tube shape can be inserted.

The suspension member portion 40 extends downward from the main body portion 30. The front end of the suspension member portion 40 is connected to the rear pillar 10 and the rocker 12. The suspension member portion 40 functions as a suspension member that supports a suspension device (not shown). An opening 42 through which a drive shaft (not shown) of the rear wheel is inserted is formed approximately at the center of the suspension member portion 40. A plurality of fastening seats 44 are formed on the main body portion 30 and the suspension member portion 40. In FIG. 1, dark gray-hatching is applied to the fastening seat 44. The fastening seat 44 is a portion to which the arm portion 72 of the suspension device is fastened.

The tower portion 50 extends upward from the upper end of the main body portion 30. The tower portion 50 functions as a suspension tower that houses a part of a shock absorber (not shown) of the suspension device. The tower portion 50 has a tower shape opened toward the lower side of the vehicle. In other words, the tower portion 50 has a mounting recess 52 opened below the vehicle. The shock absorber is inserted into the mounting recess 52 from below and fixed to the tower portion 50.

The tower portion 50 is provided with a third assembly portion 54, a fourth assembly portion 56, and a fifth assembly portion 58. The third assembly portion 54 is disposed on the top surface of the tower portion 50. The rear end of the roof rail 16 is assembled to the third assembly portion 54. The fourth assembly portion 56 is disposed near the upper end of the tower portion 50 and at the rear end thereof. The rear end of the cross connection member 70 is assembled to the fourth assembly portion 56. The fourth assembly portion 56 has a rectangular cylindrical shape, and the cross connection member 70 can be inserted into the fourth assembly portion 56. The fifth assembly portion 58 is disposed near the upper end of the tower portion 50 and at the front end. The front end of the connecting member 80 is assembled to the fifth assembly portion 58. The fifth assembly portion 58 has a rectangular cylindrical shape, and the connecting member 80 can be inserted into the fifth assembly portion 58.

The rear side member 60 is a skeleton member extending from the rear end of the main body portion 30 toward the rear of the vehicle. The rear side member 60 is a rectangular cylindrical extruded member. An end plate 62 is joined to the rear end of the rear side member 60.

A cross connection member 70 is disposed above the rear side member 60 in the vehicle. The cross connection member 70 is a skeleton member formed of a rectangular cylindrical extruded member. As shown in FIG. 2, the cross connection member 70 has an approximately U-shape convex toward the rear of the vehicle in a plan view. More specifically, the cross connection member 70 is roughly divided into a pair of arm portions 72 and a connecting portion 74. The arm portion 72 extends rearward from the fourth assembly portion 56 of the tower portion 50. More precisely, the arm portion 72 approaches the center in the vehicle width direction as it extends rearward in a plan view. The arm portion 72 is inclined with respect to the rear side member 60 in a plan view. Accordingly, the front end of the arm portion 72 is positioned on the outer side in the vehicle width direction of the rear side member 60, and the rear end of the arm portion 72 is positioned on the inner side in the vehicle width direction of the rear side member 60. Accordingly, in plan view, the arm portion 72 crosses the rear side member 60. Further, as shown in FIG. 1, the arm portion 72 approaches the rear side member 60 as it extends rearward in a side view. The connecting portion 74 connects the rear ends of the two arm portions 72 in the vehicle width direction. A support plate 78 (see FIG. 1) is attached to the center of the connecting portion 74 in the vehicle width direction. The support plate 78 is a plate material that connects the connecting portion 74 and a floor panel (not shown). The rear end of the cross connection member 70 is positioned in front of the rear end of the rear side member 60.

Figure 3:
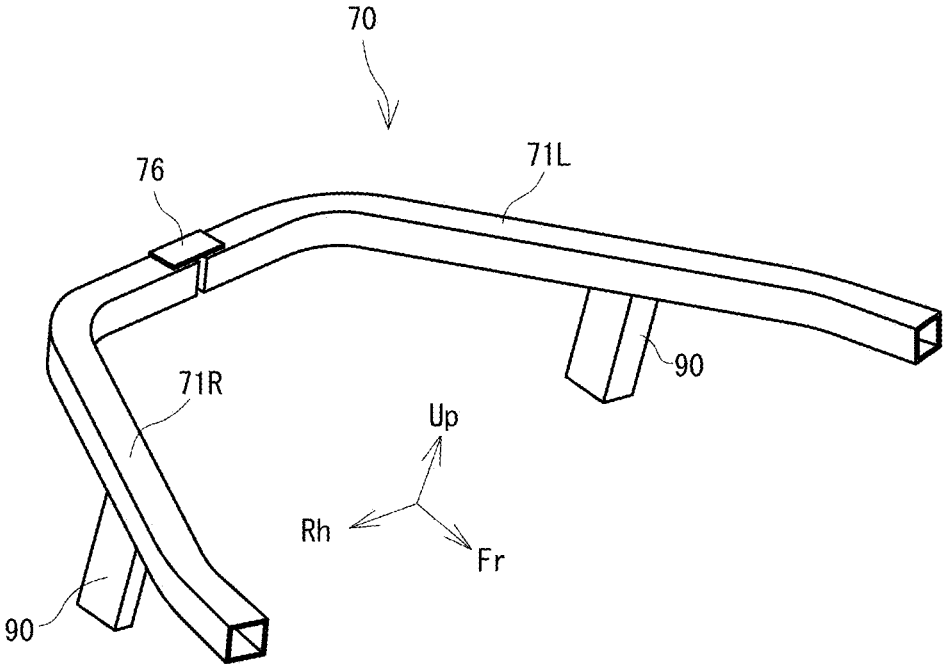
FIG. 3 is a perspective view showing another example of the cross connection member.

In FIGS. 1 and 2, the cross connection member 70 is illustrated as a single member. However, as shown in FIG. 3, the cross connection member 70 may be configured by combining the right cross connection piece 71R and the left cross connection piece 71L. In this case, the right cross connection piece 71R is symmetrical with the left cross connection piece 71L. The right cross connection piece 71R and the left cross connection piece 71L are connected to each other at the connecting portion 74 via the connecting plate 76.

As shown in FIG. 1, the arm portion 72 of the cross connection member 70 and the rear side member 60 are vertically connected by a vertical post 90. The vertical post 90 is a rectangular cylindrical member. The vertical post 90 is disposed at a position where the arm portion 72 and the rear side member 60 intersect with each other in a plan view.

A floor panel (not shown) is disposed between the pair of rear side members 60. The upper space of the floor panel functions as a luggage space. An access opening 96 (see FIG. 2) for accessing the luggage space is formed at the upper end of the luggage space. The access opening 96 extends in an approximately horizontal direction at a height approximately equal to that of the cross connection member 70. The cross connection member 70 surrounds a part of the peripheral edge of the access opening 96.

As shown in FIG. 1, a rear door 94 is disposed above the cross connection member 70. The rear door 94 is a lid member that closes the access opening 96. A swing shaft extending in the vehicle width direction is set near the front end of the rear door 94, and the rear door 94 is opened and closed by swinging around the swing shaft.

As shown in FIGS. 1 and 2, a connecting member 80 is further disposed between the tower portion 50 and the rear pillar 10. The connecting member 80 is a skeleton member that connects the upper front corner of the main body portion 30 and the upper end of the tower portion 50. The connecting member 80 is a rectangular tube-shaped extruded member. The connecting member 80 extends obliquely upward from the upper front corner of the main body portion 30, then curves, and extends rearward of the vehicle. Accordingly, the connecting member 80 is roughly divided into a rising portion 82, a bending portion 84, and a lateral portion 86. The rising portion 82 stands from the upper front corner of the main body portion 30. The lower end of the rising portion 82 is assembled to the first assembly portion 32. The rear end of the lateral portion 86 is assembled to the fourth assembly portion 56. Here, as is apparent from FIG. 1, the lateral portion 86 is positioned on an extension line of the arm portion 72 of the cross connection member 70 in a side view.

As shown in FIG. 2, a plurality of cross members are further disposed in the rear portion of the vehicle. Specifically, in order from the front side of the vehicle, the second cross member 20, the first cross member 18, and the third cross member 22 are arranged at intervals in the longitudinal direction of the vehicle. The three cross members 18, 20 and 22 are arranged at approximately the same height.

The first cross member 18 connects the lower ends of the tower portions 50 of the pair of rear component members 28 to each other in the vehicle width direction. The second cross member 20 connects the front ends of the pair of rear component members 28 to each other in the vehicle width direction. Both left and right ends of the third cross member 22 connect the rear ends of the pair of rear component members 28 to each other in the vehicle width direction.

Here, as is apparent from the above description, in the case of the vehicle rear structure disclosed in the present specification, the suspension tower, the suspension member, and the side member are integrally cast as the rear component member 28. With such a configuration, the number of components of the vehicle can be reduced. Further, the connecting portion between the members tends to become a weak portion where stress is likely to concentrate. By integrally casting the three members, such a connecting portion can be eliminated, so that the rigidity of the vehicle body around the suspension device is improved.

Further, in the case of the vehicle rear structure disclosed in the present specification, the rear side member 60, the cross connection member 70 and the connecting member 80 are each a rectangular cylindrical extruded member. When such an extruded member is used as a skeleton member, the vehicle rigidity can be improved as compared with a case where a skeleton member formed by joining a plurality of panel materials is used.

Further, an approximately U-shaped cross connection member 70 convex toward the rear of the vehicle in a plan view is disposed rearward of the tower portion 50 with respect to the vehicle. The cross connection member 70 surrounds a portion of the peripheral edge of the access opening 96. Normally, the rigidity of the periphery of the access opening 96 tends to decrease. The peripheral edge of the access opening 96 is surrounded by the cross connection member 70 to further improve the rigidity of the rear portion of the vehicle. In this case, since the rear door 94 is supported by the cross connection member 70, the rigidity of the rear door 94 is improved.

As shown in FIG. 1, the vertical post 90 connects the arm portion 72 and the rear side member 60 vertically. Thereby, the rear side member 60 is reinforced by the vertical post 90 and the cross connection member 70. As a result, the rigidity of the vehicle behind the rear component member 28 can be improved.

Here, in a case where a rear collision occurs, when buckling of the rear side member 60 occurs early, collision energy is transmitted to the cabin side without being sufficiently consumed by deformation of the rear side member 60. In the case of the vehicle rear structure disclosed herein, since the rear side member 60 is reinforced by the vertical post 90, early buckling of the rear side member 60 is prevented. Thus, the collision energy is sufficiently consumed in the rear side member 60, thereby appropriately protecting the cabin.

Further, as shown in FIG. 1, in a side view, an approximately rectangular ring shape C is formed by the rear side member 60, the vertical post 90, the arm portion 72, and the tower portion 50. The four members 60, 90, 72, and 50 constituting the ring shape C suppress deformation of each other. Since the four members 60, 90, 72, and 50 constituting the ring shape C transmit the applied collision load to each other, the collision load is dispersed. As a result, deformation of the four members 60, 90, 72, and 50 constituting the ring shape C is effectively prevented, and the rigidity of the vehicle at the rear portion of the vehicle is further improved.

Further, by providing the vertical post 90, the rigidity of the vehicle body around the access opening 96 is further improved. That is, usually, the rigidity of the vehicle body around the opening tends to decrease. In the case of the vehicle rear structure disclosed herein, the cross connection member 70 encloses a portion of the perimeter of the access opening 96. Therefore, the vehicle body around the access opening 96 is reinforced by the cross connection member 70. As a result, the rigidity of the vehicle body around the access opening 96 is improved. Further, in the case of the vehicle rear structure disclosed in the present specification, the cross connection member 70 is supported from below by the vertical post 90. Therefore, by providing the vertical post 90, the rigidity of the vehicle body around the access opening 96 is further improved. In particular, when the rear door 94 is closed, a downward force is applied to the cross connection member 70. Since the cross connection member 70 is supported from below by the vertical post 90, even if such downward force is applied, the cross connection member 70 and the surrounding vehicle body do not deform.

As described above, the vertical post 90 is disposed at a position where the arm portion 72 and the rear side member 60 intersect with each other in a plan view. With this arrangement, as shown in FIGS. 1 and 3, the vertical post 90 has a simple shape extending straight in the vertical direction. With such a configuration, the downward force exerted on the cross connection member 70 can be reliably received by the rear side member 60. Further, since the vertical post 90 does not have a portion where stress is concentrated like a curved portion, the rigidity of the vertical post 90 and, consequently, the rigidity of the rear portion of the vehicle is improved.

The rear side member 60 has a larger cross-sectional area than the cross connection member 70 and has a higher rigidity than the cross connection member 70. As shown in FIGS. 1 and 2, the rear end of the rear side member 60 is positioned rearward of the rear end of the cross connection member 70. Therefore, when a rear collision occurs, the rear side member 60 receives a collision load prior to the cross connection member 70. Since the rear side member 60 having high rigidity receives a collision load, deformation of the rear portion of the vehicle can be effectively suppressed, and consequently, the cabin can be appropriately protected.

Any of the configurations described above is an example, and other configurations may be modified as long as they have the configuration described in claim 1. For example, the shape and position of the vertical post 90 may be changed as appropriate. Further, the shape of the cross connection member 70 may be appropriately changed.

REFERENCE SIGNS LIST

10 rear pillar, 12 rocker, 14 connection plate, 16 roof rail, 18 first cross member, 20 second cross member, 22 third cross member, 28 rear component member, 30 main body portion, 32 first assembly portion, 34 second assembly portion, 40 suspension member portion, 42 opening, 44 fastening seat, 50 tower portion, 52 mounting recess, 54 third assembly portion, 56 fourth assembly portion, 58 fifth assembly portion, 60 rear side member, 62 end plate, 70 cross connection member, 72 arm portion, 74 connecting portion, 76 connecting plate, 78 support plate, 80 connecting member, 82 rising portion, 84 bending portion, 86 lateral portion, 90 vertical post, 94 rear door, 96 access opening, C ring shape.

The invention claimed is:

1. A vehicle rear structure, comprising:

first and second rear component members disposed at intervals in a vehicle width direction;

first and second rear side members disposed at intervals in the vehicle width direction, and extending respectively from rear ends of the first and second rear component members toward a rear side of a vehicle;

a cross connection member connecting the first and second rear component members to each other; and first and second vertical posts, wherein each of the first and second rear component members is a hollow member in which a main body portion, a tower portion, and a suspension member portion are integrally cast, wherein the main body portion has a front end connected to a rear pillar and a rear end connected to a corresponding one of the first and second rear side members, the tower portion has a tower shape opened toward a lower side of the vehicle so as to receive a part of a suspension device, and extends from the main body portion toward an upper side of the vehicle, the suspension member portion supports the suspension device, and extends from the main body portion toward the lower side of the vehicle, and the suspension member portion has a front end connected to a rocker, the cross connection member includes a connecting portion and first and second arm portions, wherein the connecting portion is disposed rearward of the first and second rear component members and extends in the vehicle width direction, the first and second arm portions extend respectively from first and second ends of the connecting portion in the vehicle width direction toward a front side of the vehicle, and the first arm portion is connected to the tower portion of the first rear component member, and the second arm portion is connected to the tower portion of the second rear component member, the cross connection member has an approximately U-shaped shape convex toward the rear side in a plan view of the vehicle rear structure, and the first vertical post vertically connects the first arm portion and the first rear side member, and the second vertical post vertically connects the second arm portion and the second rear side member.

2. The vehicle rear structure according to claim 1, wherein the first rear side member extends from the rear end of the main body portion of the first rear component member toward the rear side of the vehicle, the second rear side member extends from the rear end of the main body portion of the second rear component member toward the rear side of the vehicle, and in a side view of the vehicle, a rectangular ring shape is formed by the first rear side member, the first vertical post, the first arm portion, and the tower portion of the first rear component member, and a further rectangular ring shape is formed by the second rear side member, the second vertical post, the second arm portion, and the tower portion of the second rear component member.

3. The vehicle rear structure according to claim 1, wherein a rear end of each of the first and second rear side members is positioned rearward of a rear end of the cross connection member.

4. The vehicle rear structure according to claim 1, wherein each arm portion of the first and second arm portions is inclined with respect to a corresponding rear side member of the first and second rear side members in the plan view such that a front end of the arm portion is positioned at an outer side in the vehicle width direction with respect to the corresponding rear side member and a rear end of the arm portion is positioned at an inner side in the vehicle width direction with respect to the corresponding rear side member, and the first vertical post is disposed at a position where the first arm portion and the first rear side member intersect with each other in the plan view, and the second vertical post is disposed at a position where the second arm portion and the second rear side member intersect with each other in the plan view.

5. The vehicle rear structure according to claim 4, further comprising:

an access opening in communication with a luggage space; and a rear door for opening and closing the access opening, wherein the access opening extends in an approximately horizontal direction at a height substantially equal to that of the cross connection member, the cross connection member surrounds a portion of a peripheral edge of the access opening, the rear door is disposed above the cross connection member, and the first and second rear side members and the cross connection member are cylindrical extruded members.

\* \* \* \* \*